(12) United States Patent
Mullen et al.

(10) Patent No.: US 6,418,747 B1
(45) Date of Patent: Jul. 16, 2002

(54) CLIMATE CONTROL SYSTEM HAVING ELECTROMAGNETIC COMPRESSOR

(75) Inventors: John Harry Mullen, Chesterfield; Patrick Gerard Vogel, St. Louis, both of MO (US); Thomas Paul Gielda, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/639,406

(22) Filed: Aug. 15, 2000

(51) Int. Cl.⁷ ............................................... F25B 17/02
(52) U.S. Cl. ........................................ 62/434; 62/402
(58) Field of Search .......................... 62/86, 87, 401, 62/402, 434

(56) References Cited

U.S. PATENT DOCUMENTS

| | | | |
|---|---|---|---|
| 2,409,159 A | * 10/1946 | Singleton ..................... | 62/402 |
| 3,171,268 A | * 3/1965 | Silver .......................... | 62/402 |
| 3,234,738 A | * 2/1966 | Cook ........................... | 62/402 |
| 4,762,169 A | * 8/1988 | Anderson et al. ............. | 165/25 |
| 5,524,442 A | * 6/1996 | Bergman, Jr. et al. .......... | 62/86 |
| 5,752,566 A | 5/1998 | Liu et al. | |
| 5,943,877 A | * 8/1999 | Chen ........................... | 62/402 |

* cited by examiner

Primary Examiner—Ronald Capossela
(74) Attorney, Agent, or Firm—Larry I. Shelton

(57) ABSTRACT

A climate control system includes an electromagnetic compressor that receives a noble gas in a first state and compresses the gas to a second state without a change in phase. The climate control system also includes a gas cooler operatively connected to the electromagnetic compressor, such that the gas cooler receives the gas in the second state and cools the gas to a third state without a change of phase. The climate control system further includes a power generator operatively connected to said gas cooler, such that the power generator receives the gas in the third state and decreases a pressure and an enthalpy of the gas without changing phase to a fourth state. The climate control system still further includes a cooler core operatively connected to the power generator, such that the cooler core receives the gas in the fourth state and air to be cooled, and operatively extracts heat from the air and returns the gas without changing phase to the first state.

19 Claims, 2 Drawing Sheets

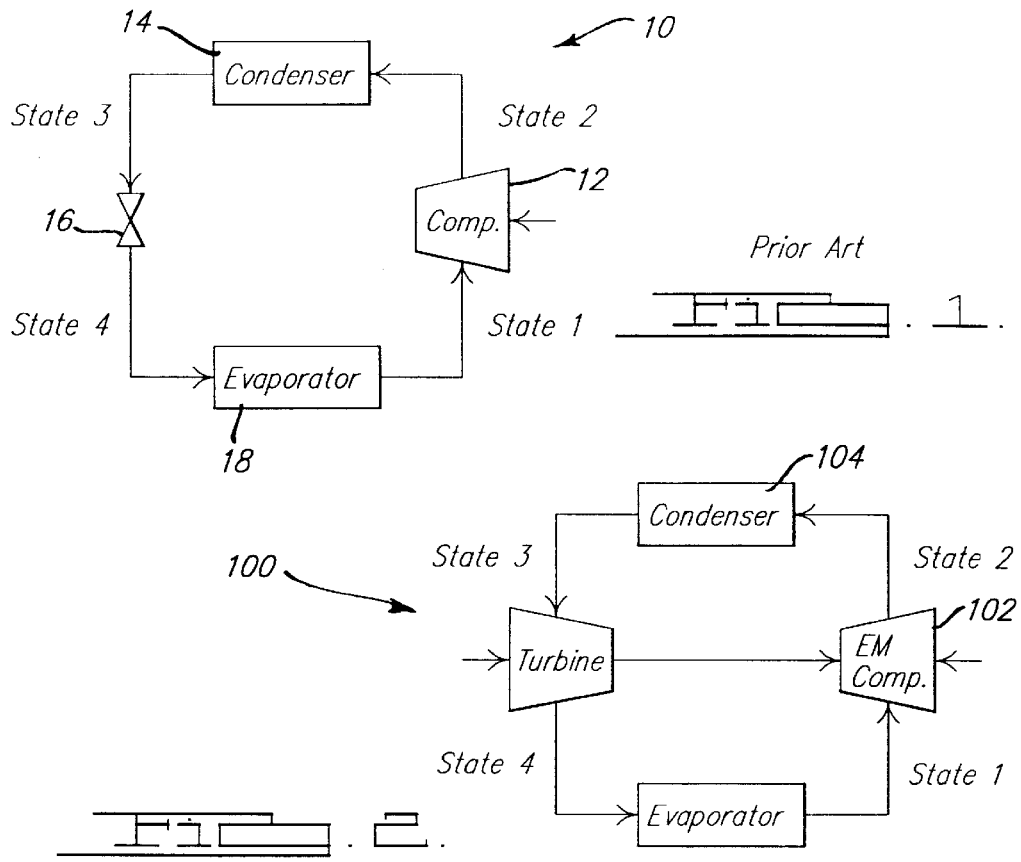
*Prior Art*
FIG. 1.
FIG. 2.
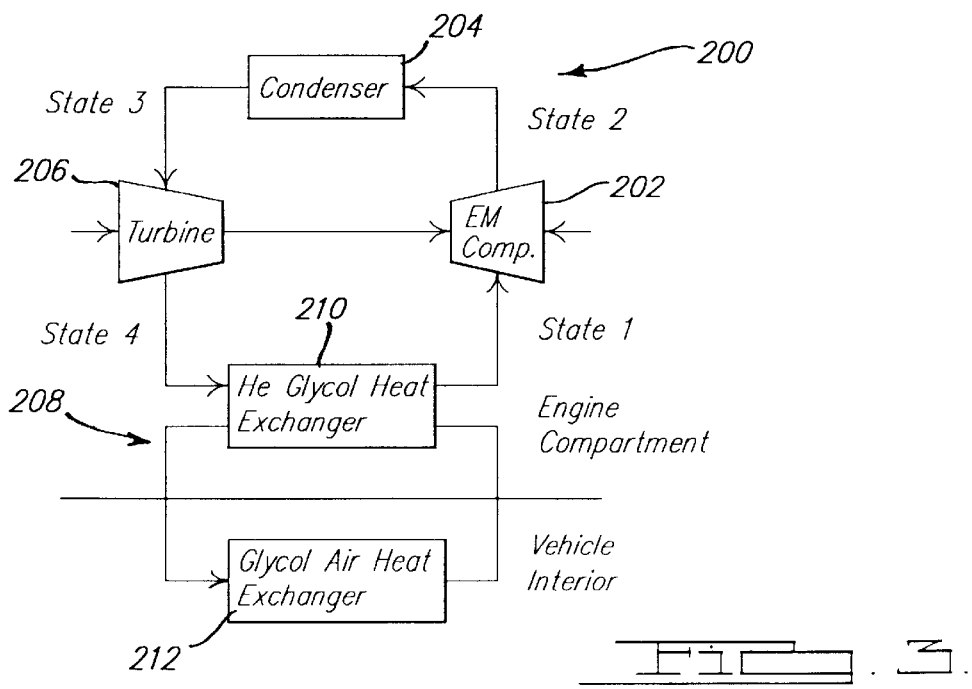
FIG. 3.

CLIMATE CONTROL SYSTEM HAVING ELECTROMAGNETIC COMPRESSOR

BACKGROUND OF THE INVENTION

1. Field of the Invention

The present invention relates generally to climate control systems and, more specifically, to a climate control system having an electromagnetic compressor for a vehicle.

2. Description of the Related Art

A vehicle, such as an automotive vehicle, includes a climate control system, which maintains a temperature within an occupant compartment of the vehicle at a comfortable level by providing heating, cooling and ventilation. The climate control system also provides for good visibility through the windshield and other windows of the vehicle. Various factors, such as occupant compartment temperature, ambient temperature, external air flow and heat radiation, affect the ability of the climate control system to maintain occupant compartment comfort.

The cooling function of the climate control system is typically accomplished using a closed loop vapor compression cycle. The vapor compression cycle utilizes a working fluid or refrigerant that changes state to effectively provide conditioned air to the occupant compartment. In the past, various fluorocarbon-based refrigerants were used as the working fluid within the climate control system of the vehicle. Although Freon was successfully used in the past as a working fluid, it is now considered a "greenhouse" gas. Greenhouse gases are known to contribute to global warming of the environment. More recently, global warming environmental concerns have resulted in the promulgation of Federal and State laws requiring the use of R134A as a refrigerant within the climate control system of the vehicle. Although, R134A is also considered a greenhouse gas, it has a lesser effect on global warming than Freon. Thus, there is a need in the art to provide a climate control system that includes a Brayton refrigeration cycle utilizing an electromagnetic compressor and a non-fluorocarbon based gas as a working fluid.

SUMMARY OF THE INVENTION

Accordingly, the present invention is a climate control system including an electromagnetic compressor that receives a noble gas in a first state and compresses the gas to a second state without a change in phase. The climate control system also includes a gas cooler operatively connected to the electromagnetic compressor, such that the gas cooler receives the gas in the second state and cools the gas to a third state without a change of phase. The climate control system further includes a power generator operatively connected to the gas cooler, such that the power generator receives the gas in the third state and decreases a pressure and an enthalpy of the gas without changing phase to a fourth state. The climate control system still further includes a cooler core operatively connected to the power generator, such that the cooler core receives the gas in the fourth state and air to be cooled, and operatively extracts heat from the air and returns the gas without changing phase to the first state.

One advantage of the present invention is that a climate control system is provided that utilizes an electromagnetic compressor in place of a mechanical compressor for a Brayton refrigeration cycle within the climate control system of a vehicle. Another advantage of the present invention is that the climate control system utilizes a nonfluorocarbon based noble gas, such as helium, as a working gas for the Brayton refrigeration cycle within the climate control system of the vehicle. Still another advantage of the present invention is that the climate control system includes an electromagnetic compressor having no moving parts and requiring no refrigerant oil. Yet another advantage of the present invention is that the climate control system utilizes a turbo-alternator to extract power from a noble gas to energize the electromagnetic compressor. A further advantage of the present invention is that the climate control system includes an electromagnetic. compressor having a magnetron as a power input. Still a further advantage of the present invention is that the climate control system includes an electromagnetic compressor having an electrode as a power input. Yet a further advantage of the present invention is that the climate control system includes an electromagnetic compressor compatible with either a single loop or dual loop Brayton refrigeration cycle.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a block diagram of a prior art vapor compression cycle for a climate control system on a vehicle.

FIG. 2 is a block diagram of a climate control system having an electromagnetic compressor, according to the present invention.

FIG. 3 is a diagram of another embodiment of a climate control system having an electromagnetic compressor, according to the present invention.

DESCRIPTION OF THE PREFERRED EMBODIMENT(S)

Figure 4A:
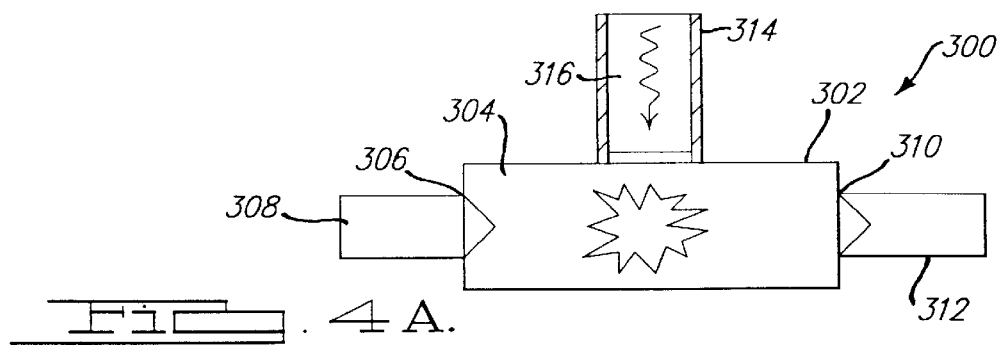
FIG. 4A is a schematic diagram of one embodiment of an electromagnetic compressor, according to the present invention, for the climate control system of FIG. 2 or 3.

A vehicle (not shown) includes a climate control system that provides for heating, ventilation and air conditioning of an occupant compartment of the vehicle. Preferably, the thermal management of the heating, cooling and ventilation functions are integrated into one system. It should be appreciated that the interior temperature of the vehicle may be affected by various factors such as occupant compartment temperature., ambient temperature, external airflow around the vehicle, and heat radiation from the vehicle.

In the past, the climate control system included a closed loop vapor compression cycle, as is known in the art, for conditioning a flow of air in a manner to be described. Referring to FIG. 1, an example of a prior art closed loop vapor compression refrigeration cycle 10 for a climate control system in a vehicle is illustrated. The prior art vapor compression cycle 10 utilizes a fluorocarbon-based refrigerant gas as a working fluid, such as Freon or R134A. In a first step of the vapor compression cycle, the gas flows into a mechanical compressor 12 positioned in an engine compartment (not shown) of the vehicle. The compressor 12, as is known in the art, is utilized to increase the enthalpy of the refrigerant from a first state to a second state. For example, the compressor 12 operatively compresses the refrigerant a predetermined amount to increase the pressure of the refrigerant. In this example, the refrigerant enters the compressor 12 in state 1 as a saturated vapor, and exits in state 2 as a superheated vapor.

In a next step of the vapor compression cycle, the refrigerant in state 2 from the compressor 12 flows into a condenser 14 via a passageway (not shown). Preferably the condenser 14 is positioned behind a front grill portion (not shown) of the vehicle. The condenser 14 facilitates a thermodynamic reaction between air, such as air drawn in by a fan (not shown) through the front grill, and the refrigerant. Heat is removed from the superheated vapor and the vapor is condensed and sub-cooled at almost constant pressure to change the vapor from a gas to a liquid through the transfer of heat from the refrigerant to the air. The heated air is vented to the outside air, preferably at a constant pressure.

In another step of the vapor compression cycle 10, the refrigerant, now in a liquid state 3, flows from the condenser 14 into a pressure expansion device 16. An example of the expansion device 16 is a thermal expansion valve, as is known in the art. The expansion device 16 lowers the pressure of the liquid refrigerant. The lower pressure liquid refrigerant leaves the expansion device 16 in state 4.

In a last step of the vapor compression cycle 10, the refrigerant enters an evaporator 18 in state 4. Preferably the evaporator 18 is part of an airflow handling system (not shown) for the climate control system. The airflow handling system, referred to in the art as a heating, ventilation and air conditioning (HVAC) assembly conditions a flow of air by heating or cooling the airflow and distributing the flow of conditioned air to the interior of the occupant compartment of the vehicle.

The evaporator 18 receives a flow of air to be conditioned. Depending on an air conditioning mode selected, the flow of air to be conditioned is either outside air or recirculated air from the occupant compartment. The evaporator 18 also receives the refrigerant as a liquid in state 4. The refrigerant is "boiled" at a near constant pressure to remove heat and dehumidify the air to be conditioned. The now conditioned air exits the evaporator 18 and is distributed within the occupant compartment of the vehicle. The refrigerant exits the evaporator as a saturated vapor in state 1, and the vapor compression cycle continues in a closed loop manner.

Referring to FIG. 2, one embodiment of a climate control system 100 using an electromagnetic compressor 102 is illustrated. The climate control system 100 is representative of a single closed loop Brayton refrigeration cycle, as is known in the art, for conditioning a flow of air. The climate control system 100 includes an electromagnetic compressor 102. Preferably, the working gas (not shown) for the climate control system 100 is a noble gas, such as helium. Helium is advantageous due to its relatively high thermal capacitance and low ionization potential. It should be appreciated that a mixture of noble gases, such as helium and argon or helium and Xeon may also be used as a working gas.

In a first step of the climate control system 100, the electromagnetic compressor 102 receives a gas in state 1 and compresses the gas at a pressure ratio defined as $P_2/P_1$. In this example, the pressure ratio during operation is approximately two to three. Advantageously, the electromagnetic compressor 102 utilizes electromagnetic waves to excite an electron cloud surrounding the helium atom. By pumping electromagnetic energy into the gas cloud, the pressure of the gas is elevated to state 2 in a manner to be described.

In another step of the climate control system 100, the climate control system 100 including a gas cooler 104 which receives the gas in state 2 from the electromagnetic compressor 102. An example of a gas cooler is an intercooler. The gas is cooled within the gas cooler 104 by a thermodynamic reaction from state 2 to state 3. It should be appreciated that the gas does not change phase. The cooled gas exits the gas cooler 104 in state 3.

In still another step of the climate control system 100 the pressure and enthalpy of the gas is decreased using a power generating device, such as a turbo-alternator 106. For example, the gas enters the turbo alternator 106 in state 3, and a pressure and an enthalpy of the gas is decreased to a state 4. Preferably, the turbo-alternator 106 is a single state, high efficiency turbine, as is known in the art. Also, the turbo-alternator 106 is hermetically sealed to prevent leakage of the cooling gas. In this example, the power extracted from the gas by the turbo-alternator 106 is used to provide partial power to operate the electromagnetic compressor 102. The gas exits the turbo-alternator 106 in state 4.

In a further step of the climate control system 100 heat from an air flow (not shown) is extracted. For example, the climate control system 100 includes a cooler core 108 which receives the gas in state 4 and a supply of air to be conditioned. An example of a cooler core is a heat exchanger in a chilled water refrigeration system. Heat is extracted from the air to cool the conditioned air, and the conditioned air is returned to the occupant compartment. It should be appreciated that the gas does not change phase within the evaporator 108. The gas exits the cooler core 108 in state 1, and the closed loop cycle continues.

Referring to FIG. 3, another embodiment 200, according to the present invention, of the climate control system 100 is illustrated. It should be appreciated that like parts have like functions, and the numbers are increased by one hundred. In this embodiment, the climate control system 200 includes an electromagnetic compressor 202, as previously described. This embodiment is representative of a dual closed loop Brayton refrigeration cycle. Preferably, the working gas for the cycle is a noble gas, such as helium.

In a first step for a first closed control loop for the climate control system 200, the gas is compressed using the electromagnetic compressor 202. The electromagnetic compressor 202 compresses the gas at a pressure ratio defined as $P_2/P_1$. In this example, the pressure ratio during operation is approximately two to three. The higher pressure gas exits the electromagnetic compressor 202 in state 2.

In a second step for the first closed control loop for the climate control system 200, the gas enters the gas cooler 204 in state 2 and is cooled via the thermodynamic reaction, as previously described. It should be appreciated that the gas does not change phase. The cooled gas exits the gas cooler 204 in state 3.

In a third step for the first closed control loop for the climate control system 200, a power generator 206 is used to decrease the pressure and enthalpy of the gas. For example, a turbo alternator 206 receives the gas in state 3 and decreases a pressure and an enthalpy of the gas, as previously described. Preferably, power extracted from gas by the turbo-alternator 206 is used to provide partial power to the electromagnetic compressor 202. The gas exits the turbo-alternator 206 in state 4.

In a fourth step for the climate control system 200, a second closed control loop 208 conditions a flow of air from the occupant compartment of the vehicle. The second closed control loop 208 includes a plurality of heat exchangers 210, 212. Advantageously, the second closed control loop 208 provides for greater flexibility in packaging the system 200, since a portion of the second closed control loop 208 can be located within the occupant compartment of the vehicle. In addition, a length of the lines (not shown) for transporting gas within the climate control system 200 can be reduced.

In this example, the second closed control loop 208 includes a first heat exchanger 210 operating in a closed loop with a second heat exchanger 212. Preferably, the first heat exchanger 210 is a gas liquid heat exchanger, also known as a glycol heat exchanger. This heat exchanger 210 may be positioned within the engine compartment of the vehicle. The first heat exchanger 210 receives the gas in state 4 from the turbo-alternator 206 and a fluid (not shown), such as water, from a second heat exchanger 212. Heat is extracted from the air in the first heat exchanger 210 via a thermodynamic reaction. The cooled air enters the second heat exchanger 212. Preferably, the second heat exchanger 212 is a glycol air heat exchanger positioned in the occupant compartment of the vehicle. The second heat exchanger 212 receives the fluid from the first heat exchanger 210 and cool air from the occupant compartment. It should be appreciated that the gas does not change phase within the second closed control loop 208.

Referring to FIG. 4A, an embodiment of the electromagnetic compressor 300 compatible with either of the climate control systems 100, 200 is illustrated. The electromagnetic compressor 300 compresses the working gas by adding electromagnetic energy in the form of electromagnetic waves into a gas cloud within the electromagnetic compressor 300. The electromagnetic waves excite the electron cloud surrounding the gas atoms, which in this example is helium.

The electromagnetic compressor 300 includes a body portion 302 that provides a chamber 304 for compressing the gas. The body portion 302 includes an inlet opening 306 operatively connected to an inlet valve 308 for receiving the gas. The body portion 302 also includes an outlet opening 310 operatively connected to an outlet valve 362 for directing a fluid out of the chamber 304. In this example, the inlet valve 308, is an inlet reed valve for regulating a flow of fluid into the chamber. Further in this example, the outlet valve 312 is an outlet reed valve.

The electromagnetic compressor 300 also includes a magnetron 314 as is known in the art, for ionizing the gas. The magnetron 314 generates an electromagnetic wave, such as a microwave. The capacity of the magnetron 314 is dependent on the amount of energy that is input into the helium gas within the compression chamber 304, and the rate of firing of the electromagnetic compressor 300. The electromagnetic compressor 300 also includes a wave-guide 316 disposed between the magnetron 314 and the compression chamber 304. The wave-guide 316 provides a pathway for directing the electromagnetic waves into the compression chamber 304. Preferably, the wave-guide 316 is tunable to excite the gas at an optimum frequency, based on the state of the gas.

Figure 4B:
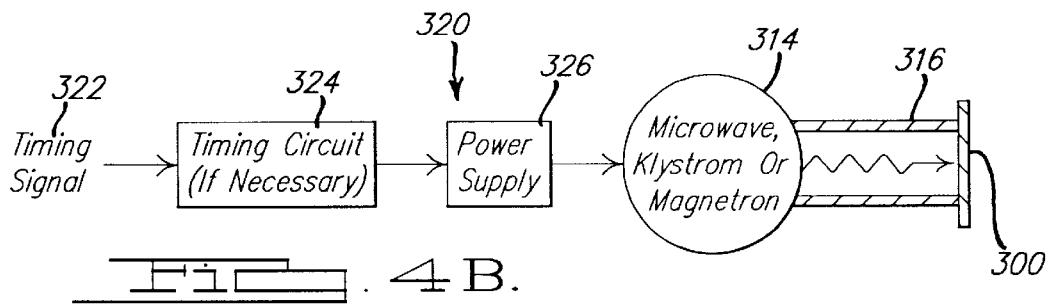
FIG. 4B is a block diagram of a power supply system, according to the present invention, for the electromagnetic compressor of FIG. 4A.

Referring to FIG. 4B, an electrical circuit 320 for operating the electromagnetic compressor 300 is illustrated. The electrical circuit 320 includes a timing signal 322 in communication with a timing circuit 324. The timing circuit 320 is electrically connected to a power supply 326. The power supply 326 provides power to the magnetron 314. The magnetron 314 transfers energy to the compression chamber 304 to ionize the gas in the following manner.

In operation, the gas, in state 1, enters the compression chamber 304 of the electromagnetic compressor 300 through the inlet valve 308. Concurrently, the magnetron 314 generates electromagnetic energy, which in this example is in the form of microwave that travels through the wave-guide 316 and into the compression chamber 304. The electromagnetic energy is pumped into the electron cloud of the helium atoms within the compression chamber 304. The microwaves breakdown as the cylinder volume becomes resonant with the microwave frequency. It should be appreciated that the transfer of the energy is extremely efficient, as compared to a mechanical compressor. Further, the energy transfer is completed in a time period of 10–100 microseconds.

After the energy is transferred to the gas atom, the pressure within the compression chamber 304 will increase. If the pressure exceeds a pressure setting of the outlet valve 312, the gas will flow out of the compression chamber 304 through the outlet valve 312. As the pressure within the compressor chamber 304 is relieved, the pressure drops below the pressure setting of the inlet valve 308. The gas, which in this example is helium, enters into the compression chamber 304, and the helium charge is reenergized, as previously described.

Figure 5A:
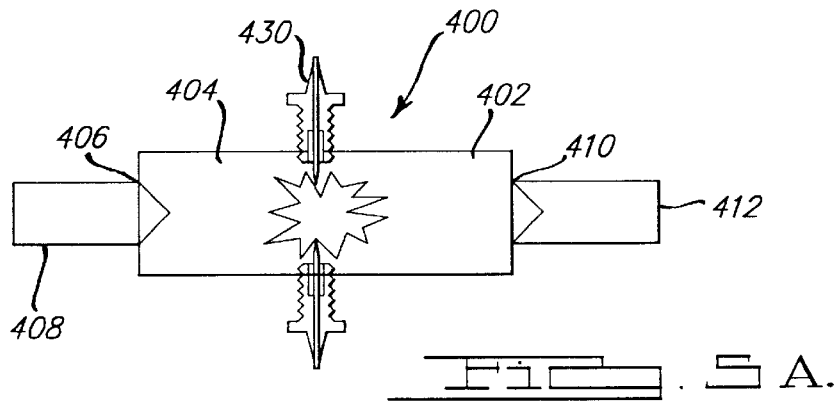
FIG. 5A is a schematic diagram of another embodiment of an electromagnetic compressor, according to the present invention, for the climate control system of FIG. 2 or 3.

Referring to FIG. 5A, another embodiment of an electromagnetic compressor 400 utilizing an electric arc as an energy source is illustrated. It should be appreciated that the electromagnetic compressor 400 is compatible with the climate control system 100 shown in FIG. 2 or the climate control system 200 shown in FIG. 3. The electromagnetic compressor 400 includes a compression chamber 404 operatively connected to an inlet valve 408 and an outlet valve 412. Preferably, the inlet valve 408 is an inlet reed valve, and the outlet valve 412 is an outlet reed valve. It should be appreciated that the compression chamber 404, inlet valve 408 and outlet valve 412 are described with respect to FIG. 4A, and like parts include like part numbers increased by one hundred.

The electromagnetic compressor 400 includes an electrical energy input device 430, such as an arc plug tungsten electrode. It should be appreciated that the electrode adds energy to the electron cloud of the gas to raise the enthalpy of the gas in a manner similar to the magnetron 314 of FIG. 5A.

Figure 5B:
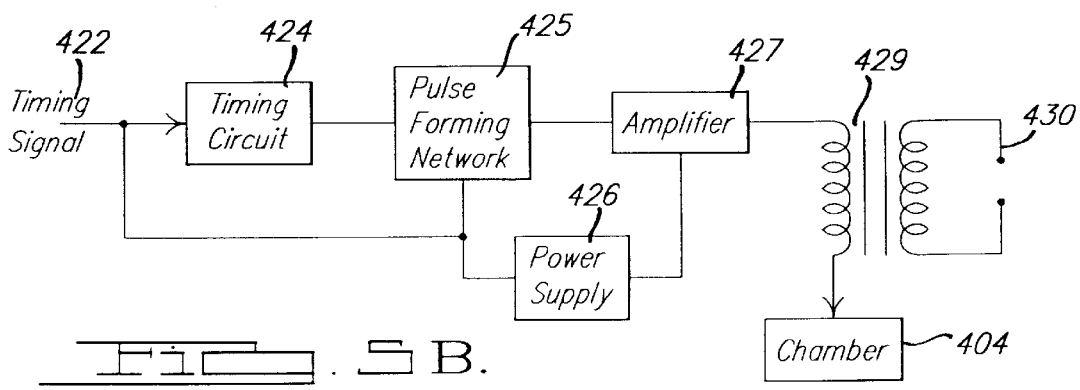
FIG. 5B is a block diagram of a power supply system, according to the present invention, for the electromagnetic compress or of FIG. 5A.

Referring to FIG. 5B, an electrical circuit 420 for the electronic arc fired electromagnetic compressor 400 is illustrated. The electrical circuit 420 includes a timing signal 422 that provides an input to a timing circuit 424. The timing circuit 424 provides an input to a pulse-forming network 425. The timing circuit 424 and pulse-forming network 425 are both electrically connected to a power supply 426. The pulse-forming network 425 provides an input signal to an amplifier 427, which enhances the signal. The amplified signal provides an input to the power supply 426 and a pulse transformer 429. The pulse transformer 429 controls the firing of the electronic arc 430 at various frequencies. The electronic arc 430 provides energy to the compressor chamber 404 to cause a thermodynamic reaction within the compressor to change the gas from the first state to the second state in the following manner.

In operation, the gas, which in this example is helium, enters the electromagnetic compressor 400 through the inlet valve 408 in a state one. Concurrently, the electronic arc 430 is fired to ionize the gas by pumping energy into the electron cloud of the gas atoms. Advantageously, the transfer of energy is extremely efficient as compared to a mechanical compression system. It should be appreciated that the energy transfer is accomplished in a time period of 10–100 microseconds.

As energy is transferred to the noble gas, the pressure within the compression chamber 404 will increase. If the pressure exceeds the pressure setting of the output valve 412, the gas will flow out of the compression chamber 404 through the outlet valve 412. As the pressure is relieved in the compression chamber 404, the pressure within the chamber 404 drops below the pressure setting of the inlet valve 408. The inlet valve 408 will open and gas in state 1 flows into the compression chamber 404. The gas charge is then reenergized, as previously described.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A climate control system comprising:
   an electromagnetic compressor, wherein said electromagnetic compressor receives a noble gas in a first state and compresses the gas to a second state without a change in phase;
   a gas cooler operatively connected to said electromagnetic compressor, wherein said gas cooler receives the gas in the second state and cools the gas to a third state without a change of phase;
   a power generator operatively connected to said condenser, wherein said power generator receives the gas in the third state and decreases a pressure and an enthalpy of the gas without changing phase to a fourth state; and
   a cooler core operatively connected to said power generator, wherein said cooler core receives the gas in the fourth state and air to be cooled, and operatively extracts heat from the air and returns the gas without changing phase to the first state.

2. A climate control system as set forth in claim 1 wherein the power generator is a turbo alternator and said turbo alternator provides power to said electromagnetic compressor.

3. A climate control system as set forth in claim 2 wherein said noble gas is helium.

4. A climate control system comprising:
   an electromagnetic compressor, wherein said electromagnetic compressor receives a noble gas in a first state and compresses the gas to a second state without a change in phase;
   a gas cooler operatively connected to said electromagnetic compressor, wherein said gas cooler receives the gas in the second state and cools the gas to a third state without a change of phase;
   a power generator operatively connected to said condenser, wherein said power generator receives the gas in the third state and decreases a pressure and an enthalpy of the gas without changing phase to a fourth state;
   a cooler core operatively connected to said power generator, wherein said cooler core receives the gas in the fourth state and air to be cooled, and operatively extracts heat from the air and returns the gas without changing phase to the first state; and
   wherein said electromagnetic compressor comprises:
   a body portion having a compression chamber, an inlet opening in said body portion, an inlet valve disposed within the inlet opening for directing the gas into the compression chamber, an outlet opening in said body portion, and an outlet valve disposed within the outlet opening for directing the gas out of the chamber;
   a magnetron for generating an electromagnetic wave; and
   a waveguide disposed between the compression chamber and the magnetron, and the waveguide directs the electromagnetic wave from the magnetron into the compression chamber, wherein electromagnetic energy from the electromagnetic wave is transferred to the gas to compress the gas.

5. A climate control system comprising:
   an electromagnetic compressor, wherein said electromagnetic compressor receives a noble gas in a first state and compresses the gas to a second state without a change in phase;
   a gas cooler operatively connected to said electromagnetic compressor, wherein said gas cooler receives the gas in the second state and cools the gas to a third state without a change of phase;
   a power generator operatively connected to said condenser, wherein said power generator receives the gas in the third state and decreases a pressure and an enthalpy of the gas without changing phase to a fourth state;
   a cooler core operatively connected to said power generator, wherein said cooler core receives the gas in the fourth state and air to be cooled, and operatively extracts heat from the air and returns the gas without changing phase to the first state; and
   wherein the electromagnetic compressor includes:
   a body portion having a compression chamber, an inlet opening in said body portion, an inlet valve disposed within the inlet opening for directing the gas into the compression chamber, an outlet opening in said body portion, and an outlet valve disposed within the outlet opening for directing the gas out of the chamber; and
   an electrical energy input device operatively connected to the compression chamber, wherein electrical energy from the electrical energy input device raises an enthalpy of the gas to compress the gas.

6. A climate control system as set forth in claim 5 wherein said electrical energy input device is an electrode.

7. A climate control system comprising:
   an electromagnetic compressor having either one of a magnetron and an electrical energy input device to compress a noble gas, wherein said electromagnetic compressor is part of a first closed control loop and said electromagnetic compressor receives the noble gas in a first state and compresses the gas to a second state without a change in phase;
   a gas cooler, wherein said gas cooler is part of a first closed control loop and said gas cooler receives the gas in the second state and cools the gas to a third state without a change in phase;
   a power generator, wherein said power generator is part of a first closed control loop and said power generator receives the gas in the third state and decreases a pressure and an enthalpy of the gas to a fourth state without a change in phase; and a second closed control loop connected to said first closed control loop, wherein said second closed control loop includes a plurality of heat exchangers operatively connected to the power generator which receive the gas in the fourth state and air to be cooled, and operatively extracts heat from the air and returns the gas without changing phase to the first state.

8. A climate control system as set forth in claim 7 wherein the power generator is a turbo alternator and said turbo alternator provides power to the electromagnetic compressor.

9. A climate control system as set forth in claim 7 wherein said noble gas is helium.

10. A climate control system comprising:
an electromagnetic compressor, wherein said electromagnetic compressor is part of a first closed control loop and said electromagnetic compressor receives a noble gas in a first state and compresses the gas to a second state without a change in phase;
a gas cooler, wherein said gas cooler is part of a first closed control loop and said gas cooler receives the gas in the second state and cools the gas to a third state without a change in phase;
a power generator, wherein said power generator is part of a first closed control loop and said power generator receives the gas in the third state and decreases a pressure and an enthalpy of the gas to a fourth state without a change in phase;
a second closed control loop connected to said first closed control loop, wherein said second closed control loop includes a plurality of heat exchangers operatively connected to the power generator which receive the gas in the fourth state and air to be cooled, and operatively extracts heat from the air and returns the gas without changing phase to the first state; and
wherein said electromagnetic compressor comprises:
a body portion having a compression chamber, an inlet opening in said body portion, an inlet valve disposed within the inlet opening for directing the gas into the compression chamber, an outlet opening in said body portion, and an outlet valve disposed within the outlet opening for directing the gas out of the chamber;
a magnetron for generating an electromagnetic wave; and
a waveguide disposed between the compression chamber and the magnetron, and the waveguide directs the electromagnetic wave from the magnetron into the compression chamber, wherein electromagnetic energy from the electromagnetic wave is transferred to the gas to compress the gas.

11. A climate control system comprising:
an electromagnetic compressor, wherein said electromagnetic compressor is part of a first closed control loop and said electromagnetic compressor receives a noble gas in a first state and compresses the gas to a second state without a change in phase;
a gas cooler, wherein said gas cooler is part of a first closed control loop and said gas cooler receives the gas in the second state and cools the gas to a third state without a change in phase;
a power generator, wherein said power generator is part of a first closed control loop and said power generator receives the gas in the third state and decreases a pressure and an enthalpy of the gas to a fourth state without a change in phase;
a second closed control loop connected to said first closed control loop, wherein said second closed control loop includes a plurality of heat exchangers operatively connected to the power generator which receive the gas in the fourth state and air to be cooled, and operatively extracts heat from the air and returns the gas without changing phase to the first state; and
wherein the electromagnetic compressor includes:
a body portion having a compression chamber, an inlet opening in said body portion, an inlet valve disposed within the inlet opening for directing the gas into the compression chamber, an outlet opening in said body portion, and an outlet valve disposed within the outlet opening for directing the gas out of the chamber; and
an electrical energy input device operatively connected to the compression chamber, wherein electrical energy from the electrical energy input device raises an enthalpy of the gas to compress the gas.

12. A climate control system as set forth in claim 11 wherein said electrical energy input device is an electrode.

13. A climate control system for a vehicle comprising:
an electromagnetic compressor having either one of a magnetron and an electrical energy input device to compress a helium gas, wherein said electromagnetic compressor receives the helium gas in a first state and compresses the helium gas to a second state without a change in phase;
a gas cooler operatively connected to said electromagnetic compressor, wherein said gas cooler receives the helium gas in the second state and cools the helium gas to a third state without a change of phase;
a power generator operatively connected to said gas cooler, wherein said power generator receives the helium gas in the third state and decreases a pressure and an enthalpy of the helium gas without changing phase to a fourth state; and
a cooler core operatively connected to said power generator, wherein said cooler core receives the helium gas in the fourth state and air to be cooled, and operatively extracts heat from the air and returns the helium gas without changing phase to the first state.

14. A climate control system as set forth in claim 13 wherein the power generator is a turbo alternator and said turbo alternator provides power to the electromagnetic compressor.

15. A climate control system as set forth in claim 13 wherein the helium gas is a mixture of helium and another noble gas.

16. A climate control system for a vehicle comprising:
an electromagnetic compressor, wherein said electromagnetic compressor receives a helium gas in a first state and compresses the helium gas to a second state without a change in phase;
a gas cooler operatively connected to said electromagnetic compressor, wherein said gas cooler receives the helium gas in the second state and cools the helium gas to a third state without a change of phase;
a power generator operatively connected to said gas cooler, wherein said power generator receives the helium gas in the third state and decreases a pressure and an enthalpy of the helium gas without changing phase to a fourth state;
a cooler core operatively connected to said power generator, wherein said cooler core receives the helium gas in the fourth state and air to be cooled, and operatively extracts heat from the air and returns the helium gas without changing phase to the first state; and wherein said electromagnetic compressor comprises:
   a body portion having a compression chamber, an inlet opening in said body portion, an inlet valve disposed within the inlet opening for directing the gas into the compression chamber, an outlet opening in said body portion, and an outlet valve disposed within the outlet opening for directing the gas out of the chamber;
   a magnetron for generating an electromagnetic wave; and
   a waveguide disposed between the compression chamber and the magnetron, and the waveguide directs the electromagnetic wave from the magnetron into the compression chamber, wherein electromagnetic energy from the electromagnetic wave is transferred to the helium gas to compress the helium gas.

17. A climate control system for a vehicle comprising:

an electromagnetic compressor, wherein said electromagnetic compressor receives a helium gas in a first state and compresses the helium gas to a second state without a change in phase;

a gas cooler operatively connected to said electromagnetic compressor, wherein said gas cooler receives the helium gas in the second state and cools the helium gas to a third state without a change of phase;

a power generator operatively connected to said gas cooler, wherein said power generator receives the helium gas in the third state and decreases a pressure and an enthalpy of the helium gas without changing phase to a fourth state;

a cooler core operatively connected to said power generator, wherein said cooler core receives the helium gas in the fourth state and air to be cooled, and operatively extracts heat from the air and returns the helium gas without changing phase to the first state; and wherein the electromagnetic compressor includes:
   a body portion having a compression chamber, an inlet opening in said body portion, an inlet valve disposed within the inlet opening for directing the helium gas into the compression chamber, an outlet opening in said body portion, and an outlet valve disposed within the outlet opening for directing the helium gas out of the chamber; and
   an electrical energy input device operatively connected to the compression chamber, wherein electrical energy from the electrical energy input device raises an enthalpy of the helium gas to compress the gas.

18. A climate control system as set forth in claim 17 wherein said electrical energy input device is an electrode.

19. A climate control system as set forth in claim 13 wherein said electromagnetic compressor, said gas cooler and said power generator are part of a first closed control loop and a second closed control loop is connected to said first closed control loop, such that said second closed control loop includes a plurality of heat exchangers operatively connected to the power generator which receives the gas in the fourth state and air to be cooled, and operatively extracts heat from the air and returns the helium gas without changing phase to the first state.

\* \* \* \* \*